United States Patent
Zhu et al.

(10) Patent No.: US 10,474,487 B2
(45) Date of Patent: Nov. 12, 2019

(54) SYSTEM, METHOD AND APPARATUS FOR MANAGING RESOURCES FOR VIRTUAL MACHINES AND DEVICE THEREOF

(71) Applicant: Alibaba Group Holding Limited, George Town, Grand Cayman (KY)

(72) Inventors: Yijun Zhu, Beijing (CN); Xing Hong, Beijing (CN)

(73) Assignee: ALIBABA GROUP HOLDING LIMITED, Georgetown, Grand Cayman (KY)

( * ) Notice: Subject to any disclaimer, the term of this patent is extended or adjusted under 35 U.S.C. 154(b) by 585 days.

(21) Appl. No.: 15/139,755

(22) Filed: Apr. 27, 2016

(65) Prior Publication Data

US 2016/0321097 A1   Nov. 3, 2016

(30) Foreign Application Priority Data

Apr. 28, 2015   (CN) .......................... 2015 1 0209553

(51) Int. Cl.
 *G06F 9/455* (2018.01)
 *G06F 16/2455* (2019.01)

(52) U.S. Cl.
 CPC .... *G06F 9/45558* (2013.01); *G06F 16/24564* (2019.01); *G06F 2009/45591* (2013.01)

(58) Field of Classification Search
 CPC .................................................... G06F 9/455
 See application file for complete search history.

(56) References Cited

U.S. PATENT DOCUMENTS

| | | | |
|---|---|---|---|
| 7,320,088 B1 | 1/2008 | Gawali | |
| 7,467,381 B2 | 12/2008 | Madukkarumukumana et al. | |
| 7,739,684 B2 | 6/2010 | Baumberger | |
| 7,856,549 B2 | 12/2010 | Wheeler | |
| 7,933,855 B2 | 4/2011 | Nauck et al. | |
| 7,962,545 B2 | 6/2011 | Knauerhase et al. | |
| 7,979,857 B2 | 7/2011 | Esfahany et al. | |
| 7,979,863 B2 | 7/2011 | Esfahany et al. | |
| 8,099,615 B2 | 1/2012 | Tripathi | |
| 8,112,527 B2 | 2/2012 | Kawato | |
| 8,127,291 B2 | 2/2012 | Pike et al. | |
| 8,156,490 B2 | 4/2012 | Bozek et al. | |
| 8,175,863 B1* | 5/2012 | Ostermeyer | ........ G06F 17/5009 703/13 |
| 8,250,572 B2 | 8/2012 | Dahlstedt | |
| 8,341,625 B2 | 12/2012 | Ferris et al. | |
| 8,386,825 B2 | 2/2013 | Tripathi | |
| 8,495,219 B2 | 7/2013 | Berthaud et al. | |
| 8,566,825 B2 | 10/2013 | Bozek et al. | |

(Continued)

FOREIGN PATENT DOCUMENTS

CN   103810020   5/2014

*Primary Examiner* — James J Lee

(57) ABSTRACT

A method, system, apparatus and device for managing resources of virtual machines are disclosed by the present disclosure. The method includes obtaining monitoring data of a virtual machine at a client. The method also includes matching the monitoring data with a pre-determined match rule to generate a match result, wherein the match rule determines whether the monitoring data satisfies a match condition of the match rule. The method further includes executing an action for the virtual machine based upon a processing strategy corresponding to the match result.

20 Claims, 7 Drawing Sheets

(56) References Cited

U.S. PATENT DOCUMENTS

| | | |
|---|---|---|
| 8,584,127 B2 | 11/2013 | Yoshida |
| 8,615,579 B1 | 12/2013 | Vincent et al. |
| 8,645,529 B2 | 2/2014 | Doddavula |
| 8,683,466 B2 | 3/2014 | Raj Seeniraj et al. |
| 8,713,563 B2 | 4/2014 | Kondoh et al. |
| 8,788,855 B2 | 6/2014 | Cong et al. |
| 8,799,895 B2 | 8/2014 | Koh et al. |
| 8,799,908 B2 | 8/2014 | Arges et al. |
| 8,799,920 B2 | 8/2014 | Lubsey et al. |
| 8,806,493 B2 | 8/2014 | Dahlstedt |
| 8,806,512 B2 | 8/2014 | Ivanov et al. |
| 8,826,277 B2 | 9/2014 | Chang et al. |
| 8,849,971 B2 | 9/2014 | Ferris |
| 8,850,432 B2 | 9/2014 | McGrath et al. |
| 8,874,744 B2 | 10/2014 | Zhang et al. |
| 8,881,164 B2 | 11/2014 | Martinka et al. |
| 8,924,988 B2 | 12/2014 | Ivanov et al. |
| 8,943,506 B2 | 1/2015 | Tang et al. |
| 8,949,432 B2 | 2/2015 | Berthaud et al. |
| 9,015,708 B2 | 4/2015 | Choudhury et al. |
| 9,021,477 B2 | 4/2015 | Choudhury et al. |
| 9,037,880 B2 | 5/2015 | Doddavula |
| 9,043,787 B2 | 5/2015 | Neuse et al. |
| 9,063,793 B2 | 6/2015 | Kim et al. |
| 9,086,897 B2 | 7/2015 | Oh et al. |
| 9,098,214 B1 | 8/2015 | Vincent et al. |
| 9,146,721 B1 | 9/2015 | Nagaraja et al. |
| 9,244,703 B2 | 1/2016 | Hiki |
| 9,250,863 B1 | 2/2016 | Vincent et al. |
| 9,311,597 B2 | 4/2016 | Bansal et al. |
| 2005/0198303 A1 | 9/2005 | Knauerhase et al. |
| 2008/0174699 A1* | 7/2008 | Suzuki .................. G06T 5/10 348/607 |
| 2009/0254610 A1 | 10/2009 | Arthursson |
| 2009/0288084 A1* | 11/2009 | Astete .................. G06F 9/45533 718/1 |
| 2012/0093318 A1 | 4/2012 | Obukhov et al. |
| 2013/0073895 A1 | 3/2013 | Cohen |
| 2013/0124932 A1 | 5/2013 | Schuh et al. |
| 2013/0246839 A1 | 9/2013 | Werner et al. |
| 2013/0290618 A1 | 10/2013 | Werner et al. |
| 2013/0297894 A1 | 11/2013 | Cohen et al. |
| 2013/0297986 A1 | 11/2013 | Cohen |
| 2013/0318289 A1 | 11/2013 | Tomlin |
| 2013/0346360 A1* | 12/2013 | Liu .................. G06F 17/30289 707/609 |
| 2014/0040530 A1 | 2/2014 | Chen et al. |
| 2014/0040531 A1 | 2/2014 | Wu et al. |
| 2014/0040639 A1 | 2/2014 | Raam |
| 2014/0040704 A1 | 2/2014 | Wu et al. |
| 2014/0059278 A1 | 2/2014 | Schuh et al. |
| 2014/0061042 A1 | 3/2014 | Ofir et al. |
| 2014/0061046 A1 | 3/2014 | Ofir et al. |
| 2014/0062722 A1 | 3/2014 | Ofir et al. |
| 2014/0082261 A1 | 3/2014 | Cohen et al. |
| 2014/0082459 A1 | 3/2014 | Li et al. |
| 2014/0108703 A1 | 4/2014 | Cohen et al. |
| 2014/0181327 A1 | 6/2014 | Cohen et al. |
| 2014/0189421 A1 | 6/2014 | Werner et al. |
| 2014/0208007 A1 | 7/2014 | Cohen et al. |
| 2014/0208062 A1 | 7/2014 | Cohen |
| 2014/0215103 A1 | 7/2014 | Cohen et al. |
| 2014/0229131 A1 | 8/2014 | Cohen et al. |
| 2014/0237166 A1 | 8/2014 | Werner et al. |
| 2014/0281171 A1 | 9/2014 | Canepa |
| 2014/0283146 A1 | 9/2014 | Obukhov |
| 2015/0154644 A1 | 6/2015 | Saxena et al. |
| 2015/0355923 A1* | 12/2015 | Keller .................. G06F 9/45558 718/1 |
| 2016/0011852 A1 | 1/2016 | Plumb |

* cited by examiner

SYSTEM, METHOD AND APPARATUS FOR MANAGING RESOURCES FOR VIRTUAL MACHINES AND DEVICE THEREOF

CROSS REFERENCE TO RELATED APPLICATION

This application claims benefit to Chinese Patent Application No. 201510209553.2, filed on Apr. 28, 2015, which is incorporated herein by reference in its entirety.

TECHNICAL FIELD

The present invention relates generally to virtual machines, and more particularly to a method and apparatus for managing resources for virtual machines, a method and apparatus for transmitting monitoring data to a server, a system for managing resources for virtual machines, as well as an electronic device thereof.

BACKGROUND

With the wide deployment of the Internet, servers have become an essential part of the Internet. However, since it is costly to deploy a complete set of servers running on the Internet, average users only lease or set up a set of virtual resources of standard scale given the cost considerations. In other words, virtual resources are divided into sub-spaces, which are presented to the user in the form of virtual machines. In general, virtual machine technologies refer to a system of executing physical servers running on the Internet, where, through software or hardware enablement, the physical servers are partitioned into a multitude of hard disk spaces of certain sizes, each disk space designated with a virtual machine having corresponding FTP rights, web access rights, etc.

In order to quantize virtual resource usage in the system described above, a monitoring system generally is deployed to collect monitoring data and to perform statistics over the data collected. Present monitoring systems typically are generally simple and they only monitor hardware resources allocated to virtual machines in terms of quantity and bandwidth. However, it is necessary to adopt different monitoring strategies for different virtual machines. For example, for virtual machines of an M3 type, bandwidth can be allocated as 10G; while for virtual machines of n M5 type, bandwidth can be allocated as 20G. As another example, upon detecting a condition where a resource usage exceeds a threshold, differentiated managing actions are also warranted, e.g., if the bandwidth usage of a virtual machine exceeds a threshold value, the virtual machine can be shut down; otherwise if the bandwidth usage of the virtual machine reaches a value of a lesser amount, e.g., 10G, the only penalty incurred is to have an alert message generated and sent.

Therefore, within systems having oversimplified monitoring of virtual machines and oversimplified processing methods associated therewith, only simple or uniformed monitoring rules and policies are implemented for monitoring and managing virtual machine resources. Therefore, it is difficult to process business specific rules and policies, or to target different virtual machines or manage business unique situations.

SUMMARY

According to an exemplary embodiment of the present disclosure, a method of managing resources for virtual machines includes obtaining monitoring data concerning a virtual machine at a client. The method also includes matching the monitoring data with a pre-determined match rule to generate a match result, where the match rule determines whether the monitoring data satisfies a match condition of the match rule. The method further includes executing an action for the virtual machine based upon a processing strategy corresponding to the match result.

Alternatively, the monitoring data of the virtual machine at the client includes, but is not limited to, at least one or more of: virtual machine type; CPU utilization data; memory utilization data; disk space utilization data; IOPS (Input Output Per Second); bandwidth and a number of concurrent connections.

Further alternatively, the match rule includes: a match condition corresponding to the monitoring data of the virtual machine; an operation; and an operating period thereof for the virtual machine upon a successful match.

Still further alternatively, the match rule includes a rule title, a product category, a virtual machine type, a match condition, an operation, and an operating period.

Yet further alternatively, the match conditions include a CPU utilization threshold, a memory utilization threshold, a disk space utilization threshold, an IOPS threshold, a disk throughput threshold, a slow request number threshold, and a bandwidth utilization threshold.

Further alternatively, the match conditions include an upper limit of the number of times a threshold of the match condition is reached. The operation of the match rule is selected from the group consisting of shutting down the virtual machine, sending an alert, and the combination thereof. The operating period of the match rule is configured to process the virtual machine according to the operation every time or only once, upon a successful match of the monitoring data and the match condition.

Alternatively, the matching the monitoring data with a pre-determined match rule to generate a match result, where the match rule determines whether the monitoring data satisfies a match condition of the match rule, includes querying a pre-configured rule database about a match rule corresponding to the virtual machine type based upon a virtual machine type of the monitoring data. The method also includes matching the monitoring data with a match condition of the inquired match rule to determine whether a value of the monitoring data exceeds a threshold of the match condition of the match rule. The method further includes, in response to a determination that the value of the monitoring data exceeds the threshold, generating a match result for the virtual machine based upon a pre-determined operation of the match rule, the match result including the operation for the virtual machine.

Further alternatively, prior to the generating a match result for the virtual machine based upon a pre-determined operation of the match rule, the match result including the operation for the virtual machine, the method further includes determining whether an upper limit of a number of times the monitoring data reaches the threshold of the match condition is met within a pre-determined time interval. The method also further includes, in response to a determination that the upper limit is met, executing a match result for the virtual machine generated based upon the pre-determined operation of the match rule, the match result including the operation for the virtual machine.

Still further alternatively, prior to the generating a match result for the virtual machine based upon a pre-determined operation of the match rule, the match result including the operation for the virtual machine, the method further includes determining whether the virtual machine is processed during in a pre-determined time interval. The method also further includes, in response to a determination that the virtual machine is not processed, executing the match result for the virtual machine generated based upon a pre-determined operation of the match rule, the match result including the operation for the virtual machine. The method also further includes, in response to a determination that the virtual machine is processed, determining whether a pre-determined operating period of the match rule is configured to execute the operations for the virtual machine every time upon a successful match of the monitoring data and the match condition. In response to a determination that the pre-determined operating period is configured to execute the operations for the virtual machine every time, the method further includes executing the match result for the virtual machine generated based upon the pre-determined operation of the match rule, the match result including the operation for the virtual machine.

Further alternatively, the executing an action for the virtual machine based upon a processing strategy corresponding to the match result includes obtaining an operation for the virtual machine included in the match result, inquiring a penalty action database about an action corresponding to the obtained operation, and executing the action for the virtual machine.

Still further alternatively, after the executing an action for the virtual machine based upon a processing strategy corresponding to the match result, the method further includes storing, in a monitoring log database, the monitoring data and the action executed for the virtual machine.

Further alternatively, after the storing, in a monitoring log database, the monitoring data and the action executed for the virtual machine, the method further includes obtaining a number of actions executed for the virtual machine by use of time information when the monitoring data and the action executed for the virtual machine are stored in the monitoring log database. If the number of the actions executed for the virtual machine is less than a pre-determined threshold, the method further includes extending a pre-determined time interval at which the monitoring data is periodically obtained. Otherwise, if the number of actions executed for the virtual machine is greater than the pre-determined threshold, the method further includes shortening a pre-determined time interval at which the monitoring data is periodically obtained.

According to another exemplary embodiment of the present disclosure, an apparatus for managing resources for virtual machines includes a monitoring data obtaining module, a matching module and a processing module. The monitoring data obtaining module is configured to obtain monitoring data of a virtual machine at a client. The matching module is configured to match the monitoring data with a pre-determined match rule to generate a match result, where the match rule determines whether the monitoring data satisfies a match condition of the match rule. The processing module is configured to execute an action for the virtual machine based upon a processing strategy corresponding to the match result.

Alternatively, the monitoring data received by the monitoring data obtaining module includes, but is not limited to, at least one or more of: virtual machine type; CPU utilization data; memory utilization data; disk space utilization data; IOPS (Input Output Per Second), bandwidth and a number of concurrent connections.

Further alternatively, the match rule utilized by the matching module to match with the monitoring data to generate a match result includes a match condition corresponding to the monitoring data of the virtual machine, an operation and an operating period thereof for the virtual machine upon a successful match.

Still further alternatively, the match rule utilized by the matching module to match with the monitoring data to generate a match result includes a rule title, a product category, a virtual machine type, a match condition, an operation and an operating period.

Still alternatively, the match condition of the match rule utilized by the matching module to match with the monitoring data to generate a match result includes a CPU utilization threshold, a memory utilization threshold, a disk space utilization threshold, an IOPS threshold, a disk throughput threshold, a slow request number threshold and a bandwidth utilization threshold.

Further alternatively, the match condition of the match rule utilized by the matching module to match with the monitoring data to generate a match result further includes an upper limit of a number of times a threshold of the match condition is reached.

Alternatively, the operations of the match rule utilized by the matching module to match with the monitoring data to generate a match result is selected from the group consisting of shutting down the virtual machine, sending an alert and the combination thereof.

Still alternatively, the operating period of the match rule utilized by the matching module to match with the monitoring data to generate a match result, upon a successful match of the monitoring data and the match condition, is configured to process the virtual machine according to the operation every time or only once.

Sill further alternatively, the matching module includes a rule database inquiring sub-module, a threshold determination sub-module and a match result generating sub-module. The rule database inquiring sub-module is configured to query a pre-configured rule database about a match rule corresponding to the virtual machine type based upon a virtual machine type of the monitoring data. The threshold determination sub-module is configured to match the monitoring data with a match condition of the inquired match rule to determine whether a value of the monitoring data exceeds a threshold of the match condition of the match rule. The match result generating sub-module is configured to receive a determination result from the threshold determination sub-module, and in response to a determination that the value of the monitoring data exceeds the threshold, to generate a match result for the virtual machine based upon a pre-determined operation of the match rule, the match result including the operation for the virtual machine.

Further alternatively, the matching module further includes a threshold reaching number determination sub-module and a threshold reaching number execution sub-module. The threshold reaching number determination sub-module configured to, prior to generating a match result for the virtual machine based upon a pre-determined operation of the match rule, the match result including the operation for the virtual machine, determine whether an upper limit of a number of times the monitoring data reaches the threshold of the match condition is met within a pre-determined time interval. The threshold reaching number execution sub-module is configured to receive a determination result from the threshold reaching number determination sub-module, and in response to a determination that the upper limit is met, execute the match result generating module.

Yet further alternatively, the matching module further includes a processing determination sub-module, a processing execution sub-module and a processing period determination sub-module and a processing period execution sub-module. The processing determination sub-module is configured to, prior to generating a match result for the virtual machine based upon a pre-determined operation of the match rule, the match result including the operation for the virtual machine, determine whether the virtual machine is processed during in a pre-determined time interval. The processing execution sub-module is configured to receive a determination result from the processing determination sub-module, and in response to a determination that the virtual machine is not processed, execute the match result generating sub-module. The processing period determination sub-module is configured to receive a determination result from the processing determination sub-module, and in response to a determination that the virtual machine is processed, determining whether a pre-determined operating period of the match rule is configured to execute the operations for the virtual machine every time upon a successful match of the monitoring data and the match condition. The processing period execution sub-module is configured to receive a determination result from the processing period determination sub-module, and in response to a determination that the pre-determined operating period is configured to execute the operations for the virtual machine every time, execute the instructions of the match result generating sub-module.

Still yet alternatively, the processing module includes an operation obtaining sub-module, an action inquiring sub-module and an action executing sub-module. The operation obtaining sub-module is configured to obtain an operation for the virtual machine included in the match result. The action inquiring sub-module is configured to query a penalty action database about an action corresponding to the obtained operation. The action executing sub-module is configured to execute the action for the virtual machine.

Alternatively, the apparatus for managing resources for virtual machines further includes a log storing module configured to, after executing an action for the virtual machine based upon a processing strategy corresponding to the match result, store in a monitoring log database the monitoring data and the action executed for the virtual machine.

Still alternatively, the apparatus for managing resources for virtual machines further includes a processing number sub-module, a time interval extending sub-module and a time interval shortening sub-module. The processing number sub-module is configured to obtain a number of actions executed for the virtual machine by use of time information when the monitoring data and the action executed for the virtual machine are stored in the monitoring log database. The time interval extending sub-module is configured to, if the number of the actions executed for the virtual machine is less than a pre-determined threshold, extend a pre-determined time interval at which the monitoring data is periodically obtained. The time interval shortening sub-module is configured to, if the number of the actions executed for the virtual machine is greater than the pre-determined threshold, shorten a pre-determined time interval at which the monitoring data is periodically obtained.

According to yet another exemplary embodiment of the present disclosure, a method of transmitting monitoring data to a server includes obtaining monitoring data of a virtual machine and transmitting to the server the obtained monitoring data of the virtual machine.

Alternatively, the monitoring data of a virtual machine includes at least one of a virtual machine type, CPU utilization, memory utilization, disk space utilization, IOPS (Input Output Per Second), bandwidth and number of concurrent connections.

Further alternatively, the transmitting to the server the obtained monitoring data of the virtual machine includes transmitting to the server the IOPS, remaining disk space and remaining bandwidth of the virtual machine periodically by use of heartbeat packets according to a pre-determined time interval. It further includes transmitting to the server, upon detection of changes in the virtual machine, the CPU utilization, memory utilization and the number of concurrent connections by use of heartbeat packets.

According to still yet another exemplary embodiment of the present disclosure, an apparatus for transmitting monitoring data to a server includes a monitoring data obtaining module and a monitoring data transmitting module. The monitoring data obtaining module is configured to obtain monitoring data of a virtual machine. The monitoring data transmitting module is configured to transmit to the server the obtained monitoring data of the virtual machine.

Alternatively, the monitoring data obtaining module is configured to obtain monitoring data of virtual machines including at least one of a virtual machine type, CPU utilization, memory utilization, disk space utilization, IOPS (Input Output Per Second), bandwidth and number of concurrent connections.

Further alternatively, the monitoring data transmitting module is configured to transmit to the server the IOPS, remaining disk space and remaining bandwidth of the virtual machine periodically by use of heartbeat packets according to a pre-determined time interval. The monitoring data transmitting module is also configured to transmit to the server, upon detection of changes in the virtual machine, the CPU utilization, memory utilization and the number of concurrent connections by use of heartbeat packets.

According to another exemplary embodiment of the present disclosure, a system for managing resources for virtual machines includes an apparatus described above for managing resources for virtual machines, and an apparatus described above for transmitting monitoring data to a server.

According to still another exemplary embodiment of the present disclosure, an electronic device includes a display, a processor, and a storage having computer-readable instructions stored thereon to be executed when accessed by the processor. The instructions include obtaining monitoring data of a virtual machine at a client and matching the monitoring data with a pre-determined match rule to generate a match result, where the match rule determines whether the monitoring data satisfy a match condition of the match rule. The instructions further include executing an action for the virtual machine based upon a processing strategy corresponding to the match result.

Compared to the existing technologies, the present disclosure provides a system, method, apparatus and device for managing virtual machine resources. In accordance with embodiments of the present disclosure, the monitoring data are matched with matching rules and actions are executed for the virtual machine corresponding to the matched result. This approach addresses the problems that, with oversimplified monitoring of virtual machines and their associated oversimplified processing methods, only simple or uniformed monitoring rules and policies can be implemented for monitoring and managing virtual machine resources, and in these systems it is difficult to process business specific rules and policies, target different virtual machines and manage unique situations.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1A:
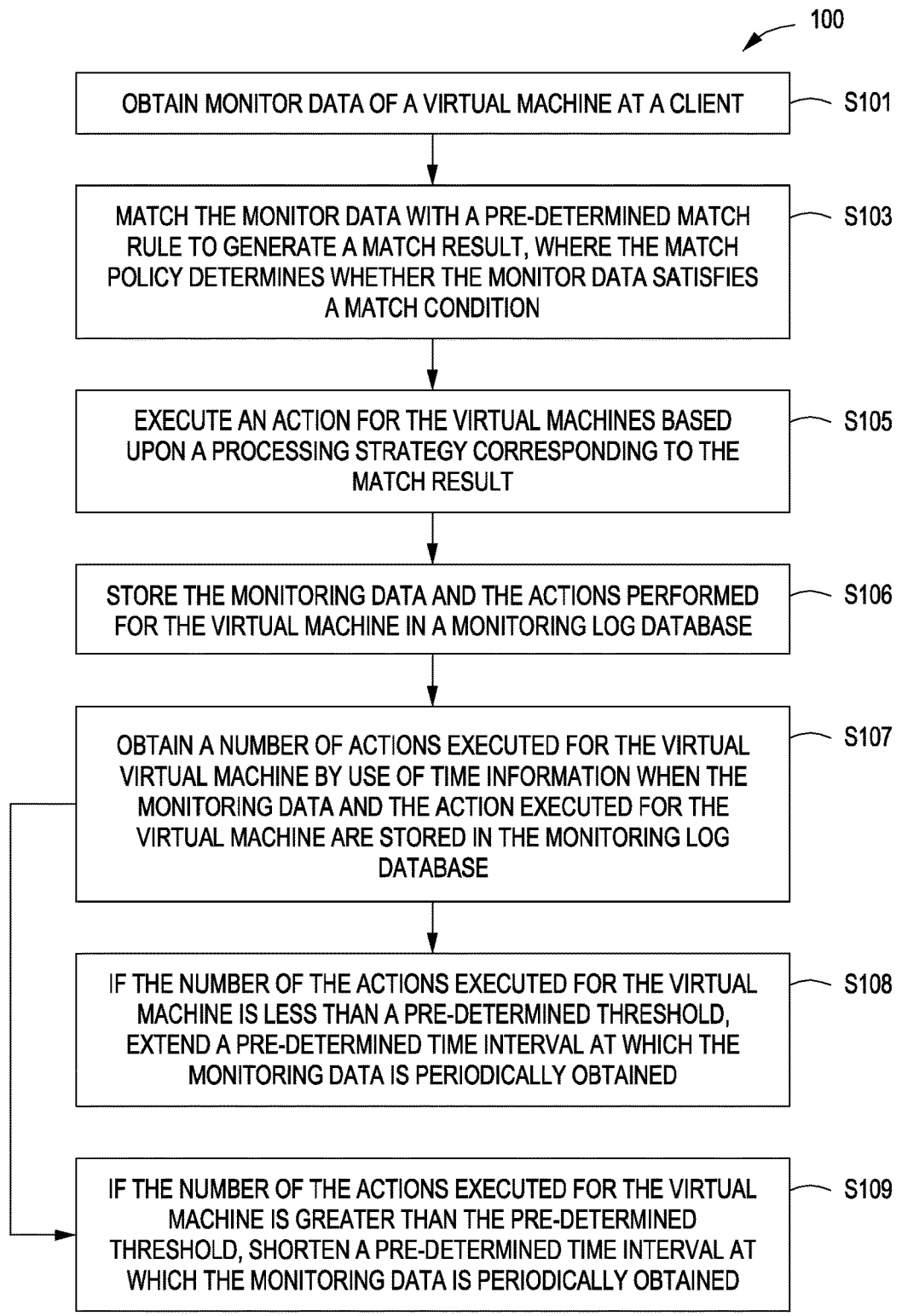
FIG. 1A is a flow chart of an exemplary computer implemented method of resource management for virtual machines in accordance with an embodiment of the present disclosure.

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Presently, monitoring methods for virtual machines are generally simplified, e.g., only monitoring hardware resources allocated to virtual machines in terms of quantity and bandwidth. However, it is necessary to adopt different monitoring strategies for different virtual machines. For example, for virtual machines of an M3 type, bandwidth can be allocated as 10G; while for virtual machines of an M5 type, bandwidth can be allocated as 20G. For another example, upon detecting a condition where a resource usage exceeds a threshold, differentiated managing actions are also warranted, e.g., if the bandwidth usage of a virtual machine exceeds the threshold value, the virtual machines is to be shut down; if the bandwidth usage of the virtual machine reaches a value of a lesser amount, e.g., 10G, the only penalty incurred is to have an alert message generated and sent.

Therefore, with such oversimplified monitoring systems for virtual machines and their associated oversimplified processing methods, only simple or uniformed monitoring rules and policies can be implemented for monitoring and managing virtual machine resources, and it is therefore difficult to process business specific rules and policies, target different virtual machines or manage unique situations.

Virtual machines refer herein to a complete set of physical servers executing on the Internet. Through software or hardware based approaches, a physical server can be partitioned into a multitude of hardware regions of certain sizes, each region having an independent virtual machine designated with corresponding FTP access rights and web access rights, etc.

Embodiments of the present disclosure provide for a server to monitor and process the monitoring data of virtual machines that are transmitted from the clients. The clients are located at the physical server to collect the monitoring data from multiple virtual machines serviced by the physical server. The clients are also configured to transmit the collected monitoring data to the server; and the server is configured to obtain the monitoring data transmitted from the clients in order to query a rule database and a penalty action database about operations to be executed for the virtual machines, and to store the monitoring data and the operations executed for the virtual machines in a log database.

Embodiments of the present disclosure are discussed herein with reference to FIGS. 1A-6. However, those skilled in the art will readily appreciate that the detailed description given herein with respect to these figures is for exemplary explanatory purposes as the disclosure extends beyond these particular embodiments.

Referring to FIG. 1A, a flow chart of an exemplary method of resource management for virtual machines is shown in accordance with embodiments of the present disclosure. The method 100 starts in step S101, where the monitoring data are obtained from a virtual machine at a client. In some embodiments, the monitoring data of the virtual machine on the client include, but is not limited to, one of the followings: virtual machine type, CPU usage data, memory usage data, remaining disk space usage data, bandwidth, the number of concurrent connections and IOPS (Input/Output Operations Per Second). It is appreciated by those with ordinary skill in the art that some or all of the above described monitoring data can be obtained for different types of virtual machines.

In some embodiments, the monitoring data of the virtual machine is obtained in the following exemplary fashion: the client periodically obtains the monitoring data of the virtual machines according to a pre-configured schedule (e.g., once every 2 hours or every 5 hours, etc.) and transmits the obtained monitoring data to the server such that the server receives the monitoring data for the virtual machines executing on the client.

In some embodiments of the present disclosure, upon detecting a change in the CPU usage, and/or the memory usage, and/or the number of concurrent connections, the client proactively transmits to the server the changed monitoring data. The other monitoring data such as data related to the IOPS, remaining disk space, and remaining bandwidth are still obtained and transmitted according to the pre-configured schedule.

In addition to the above described embodiments where the server passively receives the monitoring data of the virtual machines sent by the client, in some alternative embodiments, the server can also actively request the monitoring data to be sent from the client. In particular, the server can actively send to the client a request for monitoring data according to a pre-configured schedule, and subsequently receives the requested monitoring data from the client.

In step S103, the monitoring data are analyzed using a pre-determined match rule to generate a match result. The pre-determined match rule determines whether monitoring data match any match condition of the match rule. In some embodiments, the match rule includes match conditions corresponding to monitoring data of virtual machines, operations to be executed for virtual machines upon a successful match, and operating periods at which to execute operations for virtual machines upon a successful match.

In implementation, the match rule can be stored in a rule database, which defines a match rule table. An exemplary match rule table includes a "rule title" field, a "product category" field, a "type of virtual machine" field, a "match conditions" field, an "operations" field and an "operating period" field. The following exemplary match rule in accordance with embodiments of the present disclosure is illustrated for a system having two types of virtual machines, one being an M3 type and the other being an M5 type. The match rule includes the match conditions, operations and operating periods in the following Table 1. For the purposes of simplicity, only a part of the match conditions are listed in Table 1.

understand and yet representing the unique match condition. The product category refers herein to different types of products for which the match rules are specifically tailored. Since embodiments of the present disclosure provide for resource management for virtual machines, the product category of the match rule is thereby set as virtual machines.

The virtual machine type refers herein to the different types of virtual machines for which the match rules are specified. As virtual machines of different types utilize different amounts of resources, virtual machines can be categorized according to sizes of the resources that are allocated to the virtual machines. For example, an M3 typed virtual machine can be allocated a bandwidth of 10G; while an M5 typed one can be allocated a bandwidth of 20G.

The match conditions include data titles and their corresponding threshold values, which are used by the server in analyzing received monitoring data of virtual machines. For example, the match conditions can include a CPU usage threshold, memory usage threshold, disk space usage threshold, IOPS threshold, hard disk throughput threshold, number of slow requests threshold, and bandwidth threshold, etc. During a matching process, the threshold values corresponding to data titles of a match condition are matched with the values corresponding to the same data titles that are included in the monitoring data. For example, bandwidth usage value of 8G reported in the monitoring data is compared to the match conditions' bandwidth usage threshold value of 10G.

Further, when a server manages virtual machines resources, sometimes specialized rules or policies are required for those virtual machines that are more closely integrated with business specifics. For example, even when a virtual machine has reached or exceeded its allocated bandwidth, the virtual machine is not to be shut down in certain circumstances. In particular, a match rule can include multiple match conditions, which are the combination of different match conditions with a relationship to each other such as "AND". For example, for an M3 typed virtual machine, a match condition can be configured to include a bandwidth usage of 10G and a CPU usage of 100%.

In order to for a server to provide resource management with more precision for virtual machines that are governed with policies having a higher degree incorporation with business specifics, embodiments the present disclosure provide for matching the virtual machine monitoring data with the match conditions. In accordance with embodiments of the present disclosure, a match condition can further include an upper limit for the number of times a threshold of the match condition is met. For example, a match condition can

TABLE 1

| Rule Title | Product Category | Virtual Machine Type | Match Condition | Operations | Operating Period |
| --- | --- | --- | --- | --- | --- |
| M3 bandwidth exceeding a threshold | Virtual machine | M3 | Bandwidth usage exceeds 10 G | Shut down the virtual machine and sending an alert | Only once |
| M5 bandwidth exceeding a threshold | Virtual machine | M5 | Bandwidth usage exceeds 20 G | Shut down the virtual machine and sending an alert | Only once |

As shown in Table 1 above, the match rules include six (6) fields: rule title, product category, virtual machine type, match condition, operations and operating period. The rule title refers herein to a phrase generalized from the match condition of the match rule, the phrase being easy to have an upper limit of reaching the CPU usage threshold set as three times, with the CPU usage threshold set as 100%. With monitoring data reporting a CPU usage as 100%, upon a successful match of the monitoring data's 100% CPU usage with the 100% CPU usage condition, it still needs to be determined whether the virtual machine's CPU usage has reached the 100% threshold for the upper limit of the number of times within a certain time period (e.g., a month). It is only when the upper limit of the number of times is also reached that a positive match result will be generated.

Operations of match rules refer herein to operation identifications stored in a penalty action database, e.g., operation IDs. Exemplary operations include operations of shutting down the virtual machine, sending an alert, etc. The sending of an alert can be performed by any suitable communication techniques known in the art, including but not limited to, sending emails, wireless short messages, etc.

Further, match rule operations can specify one or more operations, such as, for example, a combination of the two operations described above, including when the bandwidth usage of a virtual machine exceeds the threshold value specified in the match rule, the server shuts down the virtual machine and sends an alert to the user.

Match rule operating periods can be configured as, for example, executing the pre-determined operations every time upon a successful match of the monitoring data with the match conditions, the pre-determined operations being performed for the virtual machine. Alternatively, upon a successful match of the monitoring data with the match conditions, the pre-determined operations can be performed only one time for the virtual machine, regardless of how many times the monitoring data reports data that match successfully with the match conditions.

It is understood that the above exemplary illustrations are only exemplary, and pre-determined match rules can be more complex. With monitoring data obtained by a server, for example, the server can monitor a much larger number of types of virtual machines as well as a larger amount of corresponding monitoring data. With the above described pre-configured match rules, virtual machines can be monitored and managed to target different virtual machines and to process business specific rules and policies therefor.

Referring to FIG. 1A, after the server obtains the monitoring data for the virtual machine at the client in step S101, match rules are applied to the obtained monitoring data. If the monitoring data exceeds a threshold value of a match condition of the match rules, a match result is generated as successful. The step of matching the monitoring data with a pre-determined match rule, which determines whether the monitoring data satisfy any match condition, to generate a match result is illustrated through the steps S103-1 to S103-3 of FIG. 1B.

Figure 1B:
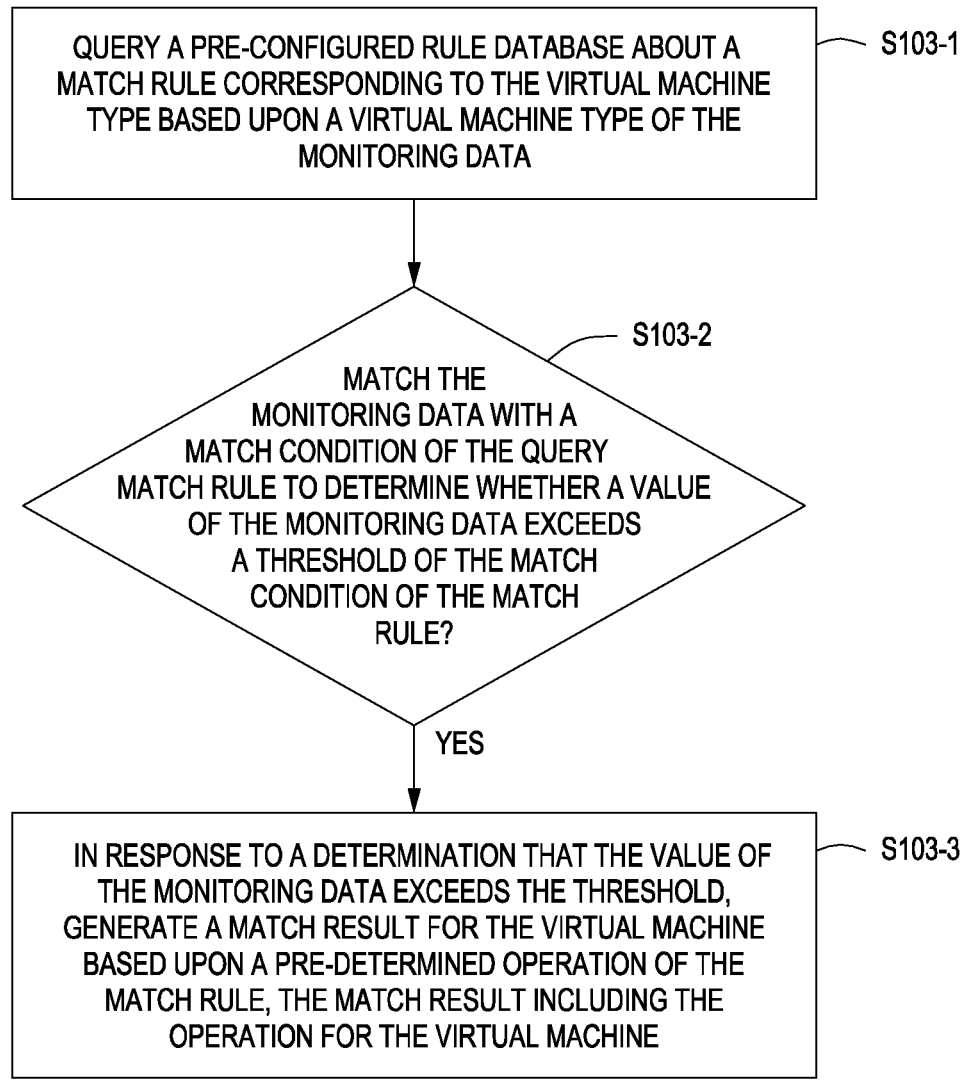
FIG. 1B is a flow chart of another exemplary computer implemented method of resource management for virtual machines in accordance with an embodiment of the present disclosure.

Referring to FIG. 1B, a flow chart of another exemplary method of resource management for virtual machines is shown in accordance with an embodiment of the present disclosure. In step S103-1, based upon the virtual machine type of the monitoring data, a match rule corresponding to the virtual machine type is inquired about using a pre-configured rule database. In some embodiments, after obtaining from the client the virtual machine monitoring data, the server analyzes the monitoring data to obtain the virtual machine types. Based upon the obtained virtual machine type, the server queries a rule database about a match rule that corresponds to the virtual machine type. For example, if the virtual machine type obtained from the monitoring data is M3, a match rule corresponding to a product category of virtual machine and to virtual machines of type M3 will be inquired about by use of a rule database.

In step S103-2, the monitoring data are matched with the match conditions of the match rule obtained from the rule database. In some embodiments, it is determined whether the values reported in the monitoring data are greater than any thresholds of a match condition of the match rule. The monitoring data are analyzed to obtain information regarding resource usage by the virtual machine in terms of CPU, memory, disk space, bandwidth, concurrent connections, IOPS and etc. The information is compared respectively in accordance with the match conditions specified by the match rule, which is obtained in step S103-1 and corresponds to the virtual machine type of the virtual machine. Accordingly, it is determined whether the virtual machine's CPU usage, memory usage, disk space usage, bandwidth usage, concurrent connections usage as well as IOPS usage exceeds the corresponding threshold values specified in the match conditions of the match rule. For example, when the information obtained from the monitoring data indicates that the CPU usage rate is 90% and the memory usage rate is 90% for a virtual machine of type M3, a match rule corresponding to the virtual machine type of M3 is utilized to match the match conditions specifying a threshold of CPU usage, a threshold of memory usage to the monitoring data to determine whether any of those thresholds are exceeded by the usage information reported in the monitoring data.

When there are multiple match conditions included in a match rule, each of the match condition is matched against the monitoring data to determine whether the usage values reported in the monitoring data exceed all the threshold values specified in the multiple match conditions of the match rule.

In step S103-3, in response to a determination that the values of the monitoring data exceed the threshold values specified in the match conditions of the match rule in step S103-2, a match result is generated based on the operations that are pre-configured in the match rule for the virtual machine; the match result including the pre-configured operations.

In some embodiments, if the values of the monitoring data are greater than the threshold values specified in the match conditions, the operations pre-configured in the match rule are retrieved to generate a match result indicating that the match is successful. The match result also includes the operations retrieved from the match rule for the virtual machine upon such successful match.

In some other embodiments, an exemplary method for a server to provide resource management with more precision for virtual machines governed with highly business specific rules and policies can also be provided. In step S103-3, after determining that the values of the monitoring data exceed the threshold values of the match conditions, and before generating a match result for the virtual machine by use of the pre-configured operations in the match rule (the match result including the pre-configured operations), the number of times the virtual machine's resource usage reaches the threshold values during a pre-determined period of time interval is obtained through the steps of S103-3-1 to S103-3-2 of FIG. 1C.

Figure 1C:
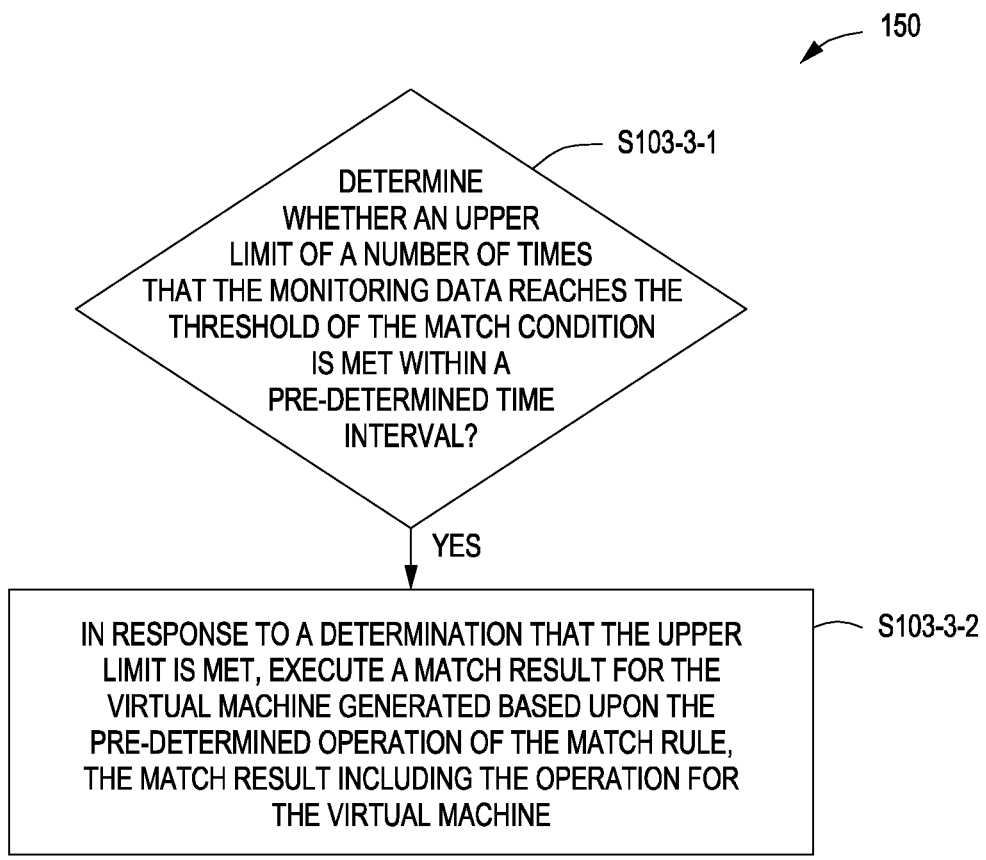
FIG. 1C is a flow chart of another exemplary computer implemented method of resource management for virtual machines in accordance with an embodiment of the present disclosure.

Referring to FIG. 1C, a flow chart of another exemplary method of resource management for virtual machines is shown in accordance with an embodiment of the present disclosure. Method 150 starts in step S103-3-1, where it is determined, within a pre-configured time period, whether the upper limit of the number of times the values reported in the monitoring data exceeding the threshold values in the match conditions is met. For example, since most virtual machines' resource usage (e.g., bandwidth usage) is computed on a monthly basis, the time period for determining whether the upper limits of the number of times a virtual machine's resource usage reaches the threshold value of the match conditions can be pre-configured every month.

In step S103-3-2, in response to a determination that the upper limit of the number of times the monitoring data exceeds the threshold values of the match conditions is met, a match result (generated based on the pre-configured operations in the match rule) is executed; the match result including the pre-configured operations to be executed for the virtual machine.

In this embodiment, if the upper limit that the number of times the monitoring data exceeds the threshold values of the match conditions is reached within a pre-configured period of time, the operations pre-specified in the match rule are retrieved to generate a match result indicating a successful match. The match result includes the operations pre-specified in the match rule, e.g., the match result includes the operations to be executed for the virtual machine.

In order for a server to provide resource management with more precision for virtual machines governed by highly business specific rules and policies, embodiments of the present disclosure provide for matching monitoring data with match conditions. In some embodiments, in step S103-3, after determining that the monitoring data exceeds the threshold values of the match conditions, and before generating a match result for the virtual machine by use of the pre-configured operations in the match rule (the match result including the pre-configured operations), it is further determined whether the virtual machine has been processed during a pre-configured period of time. Details are illustrated in steps S103-3-3 through S103-3-6 of FIG. 1D.

Figure 1D:
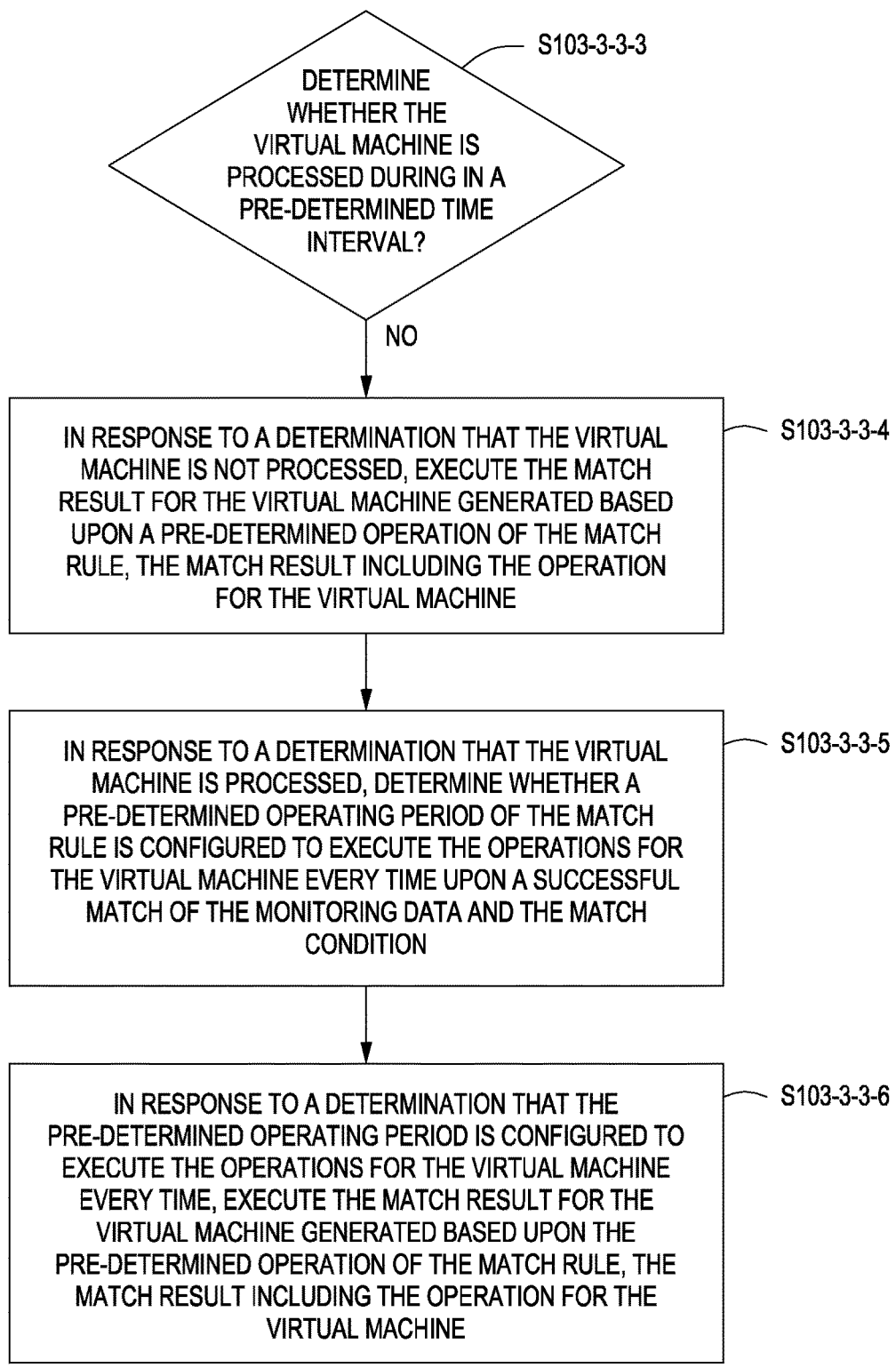
FIG. 1D is a flow chart of another exemplary computer implemented method of resource management for virtual machines in accordance with an embodiment of the present disclosure.

Referring to FIG. 1D, a flow chart of another exemplary method of resource management for virtual machines in accordance with an embodiment of the present disclosure is shown. In step S103-3-3, it is determined whether the virtual machine has been processed within a pre-configured time interval. Since most virtual machines' resource usage, such as bandwidth usage, is computed on a monthly basis, the time interval for determining whether any operation has been executed for the virtual machine can be pre-configured as every month.

In step S103-3-4, in response to a determination that the virtual machine has not been processed during the pre-configured time interval, a match result generated based on the operations pre-specified in the match rule is executed for the virtual machine. The pre-configured operations for the virtual machine are included in the match result.

In some embodiments, if the virtual machine has not been processed within the pre-configured time interval, the pre-configured operations in the match rule are retrieved to generate a match result indicating a successful match. The match result includes the operations pre-specified in the match rule, e.g., the match result includes the operations to be executed for the virtual machine.

In step S103-3-5, in response to a determination that the virtual machine has been processed, it is further determined whether the operating period is specified as executing the operations for the virtual machine upon every successful match of the monitoring data and the match conditions. In some embodiments, if any operation has been performed for the virtual machine within a pre-configured time interval, the operating period is retrieved from the match rule to determine whether the pre-specified operating period in the match rule is set to execute operations for the virtual machine every time upon a successful match of the monitoring data and the match conditions.

In step S103-3-6, in response to a determination that the operating period is configured as performing the operations for the virtual machine each time a match between the monitoring data and the match rule is successful, a match result generated by use of the operations pre-specified in the match rule is executed for the virtual machine. The match result includes the operations pre-specified in the match rule, e.g., the match result includes the operations to be executed for the virtual machine.

Referring back to FIG. 1A, in step S105, based on the match result, actions are executed for the virtual machine based on the processing strategies corresponding to the match result. In some embodiments, after step S103 where the monitoring data are matched with the match conditions to generate a match result, actions are executed for the virtual machine according to the match result. The step of executing actions for the virtual machine based on the processing strategies corresponding to the match result is illustrated in the steps S105-1 through S105-3 of FIG. 1E.

Figure 1E:
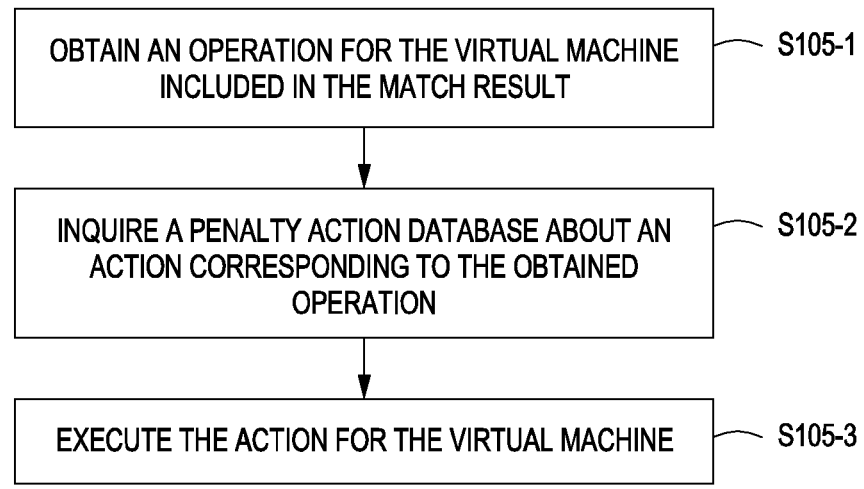
FIG. 1E is a flow chart of another exemplary computer implemented method of resource management for virtual machines in accordance with an embodiment of the present disclosure.

Referring to FIG. 1E, a flow chart of another exemplary method of resource management for virtual machines in accordance with an embodiment of the present disclosure is shown. In step S105-1, the operations for the virtual machine are obtained from the match result. In some embodiments, the match result is analyzed to retrieve the operation identifications, e.g., operation IDs from the match result.

In step S105-2, corresponding actions are obtained by querying a penalty action database based on the obtained operations. In some embodiments, based on the obtained IDs of the operations for the virtual machine, actions corresponding to the IDs are queried by use of a penalty action database. In step S105-3, the actions are executed for the virtual machine. In some embodiments, actions corresponding to the IDs of the operations are executed for the virtual machine.

In some embodiments, the operations include shutting down the virtual machine or sending an alert. The sending of an alert can be performed by exemplary methods such as sending an email message or sending a text message (e.g., SMS). The operations specified in the match rule can be more than one operation, or the combination of the two above described operations. For example, after the bandwidth usage of the virtual machine exceeds the threshold value for the bandwidth usage specified in the match condition, the server shuts down the virtual machine and sends an alert to the client.

Referring back to FIG. 1A, in order to record the actions executed for a virtual machine, an embodiment of the present disclosure is illustrated in steps S106 after step S105, where actions are executed for the virtual machine based on the processing strategies corresponding to the match result.

In step S106, the monitoring data and the actions executed for the virtual machine are recorded in a monitoring log database. In order to decrease the amount of monitoring data the server receives from the client, and to reduce the number of times the server communicates with the client and the energy and cost associated therewith on both the server and the client, an embodiment of the present disclosure is illustrated. In accordance with embodiments of the present disclosure, after the monitoring data and the actions performed for the virtual machine are stored in the monitoring log database, steps S107 through S109 are illustrated.

In step S107, by use of the time information corresponding to when the monitoring data and the actions executed for the virtual machines are stored in the monitoring log database, the number of times actions have been executed for the virtual machine during a pre-configured time interval is determined. In some embodiments, the pre-configured time interval can be every month, e.g., the number of actions executed for the virtual machine within a month is determined by use of the time information corresponding to the stored monitoring data and the executed actions in the monitoring log database.

In step S108, if the number determined in step S107 does not exceed a pre-configured limit, the pre-determined time interval, at which the monitoring data of the virtual machine is periodically obtained, is extended. In some embodiments, the extending of the pre-determined time interval refers to the server sending to the client a request to extend the pre-configured time interval at which the monitoring data is periodically obtained.

In step S109, if the number determined in step S107 exceeds a pre-configured limit, the pre-determined time interval at which the monitoring data is obtained is shortened. In some embodiments, the shortening of the pre-determined time interval refers to the server sending to the client a request to shorten the pre-configured time interval at which the monitoring data is periodically obtained.

Corresponding to the above described embodiments of methods of managing virtual machine resources, an apparatus for managing virtual machine resources is also provided in accordance with embodiments of the present disclosure. As the apparatus embodiments are substantially similar to the method embodiments described above, details are not repeated for simplicity and the pertinent details are illustrated as described above. The following descriptions are merely exemplary.

Figure 2:
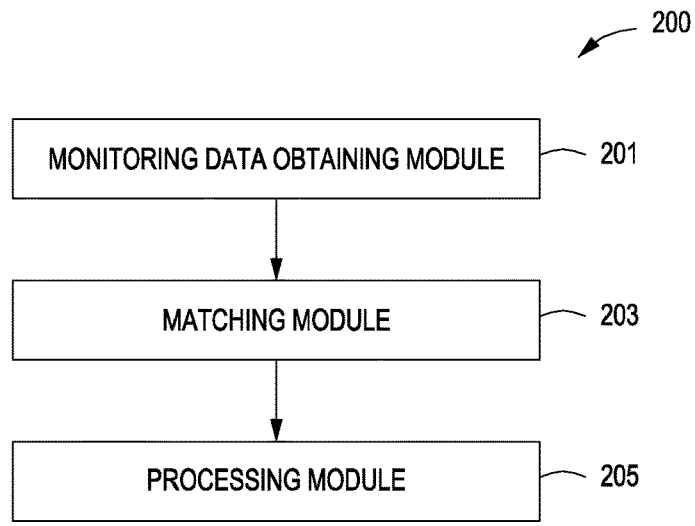
FIG. 2 is a block diagram of an exemplary apparatus for resource management for virtual machines in accordance with an embodiment of the present disclosure.

Referring to FIG. 2, a block diagram of an exemplary apparatus for managing resources of virtual machines is shown in accordance with embodiments of the present disclosure. The apparatus 200 includes a monitoring data obtaining module 201, a matching module 203 and a processing module 205. The module 201 is configured to obtain monitoring data of a virtual machine from a client. The matching module 203 is configured to match the monitoring data with a pre-determined match rule to generate a match result, where the match rule determines whether the monitoring data satisfies a match condition of the match rule. The processing module 205 is configured to execute an action for the virtual machine based upon a processing strategy corresponding to the match result.

Alternatively, the obtaining module 201 can be configured to receive monitoring data including at least one of the following: a virtual machine type, CPU utilization, memory utilization, disk space utilization, IOPS (Input Output Per Second), bandwidth and the number of concurrent connections.

Further alternatively, the match rule utilized by the matching module 203 to match with the monitoring data to generate a match result includes match conditions corresponding to the monitoring data, operations and operating periods thereof for the virtual machine upon successful matches between the match conditions and the obtained monitoring data.

Still further alternatively, the match rule described above can include the following data fields: a rule title, a product category, a virtual machine type, match conditions, operations and operating periods thereof.

Alternatively, the match conditions of the match rule utilized by the matching module 203 can include a threshold of CPU utilization, a threshold of memory utilization, a threshold of disk utilization, a threshold of IOPS, a threshold of hard disk throughput, a threshold of the number of slow requests, and a threshold of bandwidth utilization.

Still alternatively, a match condition of the match rule can further include an upper limit of a number of times a threshold of the match condition is reached. Further alternatively, the operations specified in the match rule can include shutting down the virtual machine or sending an alert.

Alternatively, the operating periods of the match rule of the matching module 203 can be configured as, upon each a time there is a successful match of the monitoring data and the match conditions, to execute the operations pre-specified in the match rule for the virtual machine. It can also be configured to execute the operations pre-specified in the match rule for the virtual machine only once, upon a successful match of the monitoring data and the match conditions.

Alternatively, the matching module 203 includes a rule database inquiring sub-module, a threshold determination sub-module and a match result generating sub-module. The rule database inquiring sub-module is configured to query a pre-configured rule database about a match rule corresponding to the virtual machine type based upon a virtual machine type of the monitoring data. The threshold determining sub-module is configured to match the monitoring data with a match condition of the inquired match rule to determine whether a value of the monitoring data exceeds a threshold of the match condition of the match rule. The match result generating sub-module is configured to receive a determination result from the threshold determination sub-module, and in response to a determination that the value of the monitoring data exceeds the threshold, to generate a match result for the virtual machine based upon a pre-determined operation of the match rule. The match result includes the operation for the virtual machine.

Further alternatively, the matching module 203 further includes a threshold reaching number determination sub-module and a threshold reaching number execution sub-module. The threshold reaching number determination sub-module is configured to determine whether an upper limit of a number of times the monitoring data reaches the threshold of the match condition is met within a pre-determined time interval, prior to the generating of a match result for the virtual machine based upon a pre-determined operation of the match rule. The threshold reaching number execution sub-module is configured to receive a determination result from the threshold reaching number determination sub-module, and in response to a determination that the upper limit is met, execute the instructions of the match result generating sub-module.

Still further alternatively, the matching module 203 further includes a processing determination sub-module, a processing execution sub-module, a processing period determination sub-module and a processing period execution sub-module. The processing determination sub-module is configured to, prior to generating a match result for the virtual machine based upon a pre-determined operation of the match rule (the match result including the operation for the virtual machine), determine whether the virtual machine is processed during in a pre-determined time interval. The processing execution sub-module is configured to receive a determination result from the processing determination sub-module, and in response to a determination that the virtual machine is not processed, execute the instructions of the match result generating sub-module. The processing period determination sub-module is configured to receive a determination result from the processing determination sub-module, and in response to a determination that the virtual machine is processed, determine whether a pre-determined operating period of the match rule is configured to execute the operations for the virtual machine every time upon a successful match of the monitoring data and the match condition. The processing period execution sub-module is configured to receive a determination result from the processing period determination sub-module, and in response to a determination that the pre-determined operating period is configured to execute the operations for the virtual machine every time, execute the instructions of the match result generating sub-module.

Alternatively, the processing module 205 includes an operation obtaining sub-module, an action inquiring sub-module, and an action executing sub-module. The operation obtaining sub-module is configured to obtain an operation for the virtual machine included in the match result. The action inquiring sub-module is configured to query a penalty action database about an action corresponding to the obtained operation. The action executing sub-module is configured to execute the action for the virtual machine.

Still alternatively, the apparatus 200 for managing resources for virtual machines further includes a long storing module. The log storing module is configured to, after executing an action for the virtual machine based upon a processing strategy corresponding to the match result, store (in a monitoring log database) the monitoring data and the action executed for the virtual machine.

Still further alternatively, the apparatus 200 can further include a time recording module. The time recording module includes a processing number sub-module, a time interval extending sub-module and a time interval shortening sub-module. The processing number sub-module is configured to obtain a number of actions executed for the virtual machine by use of time information regarding when the monitoring data, and the action executed for the virtual machine, are stored in the monitoring log database. The time interval extending sub-module is configured to, if the number of the actions executed for the virtual machine is less than a pre-determined threshold, extend a pre-determined time interval at which the monitoring data is periodically obtained. The time interval shortening sub-module configured to, if the number of the actions executed for the virtual machine is greater than the pre-determined threshold, shorten a pre-determined time interval at which the monitoring data is periodically obtained.

Figure 3:
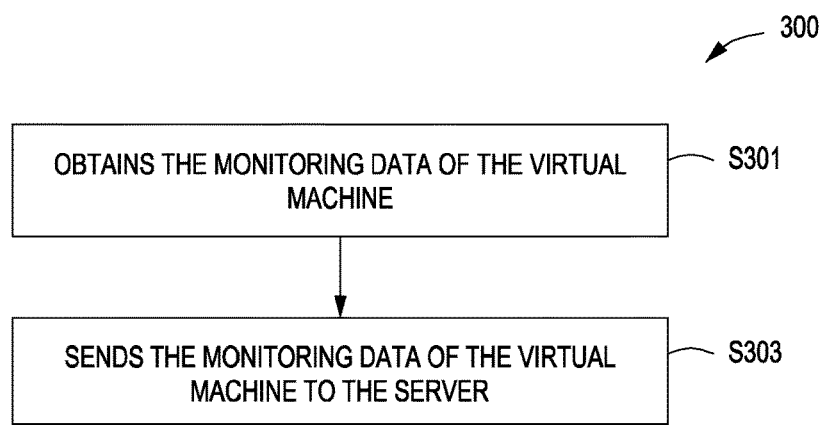
FIG. 3 is a flow chart of an exemplary computer implemented method of transmitting monitor data to a server in accordance with an embodiment of the present disclosure.

Referring to FIG. 3, a flow chart of an exemplary method of transmitting monitoring data to a server is shown in accordance with embodiments of the present disclosure. The method 300 starts in step S301, where the monitoring data of a virtual machine is obtained. In some embodiments, the obtained monitoring data include data of at least one of the following: virtual machine type, CPU utilization, memory utilization, disk space utilization, IOPS (Input Output Per Second), bandwidth and number of concurrent connections. It is appreciated by one of ordinary skill in the art that some or all of the above described monitoring data can be obtained according to different types of virtual machines.

In an implementation, the monitoring data of a virtual machine's IOPS, remaining disk space and remaining bandwidth are obtained periodically according to a pre-determined time interval; while the virtual machine's CPU usage, memory usage and the number of concurrent connections are obtained n real time.

Further, if the number of actions executed by the server for the virtual machine is less than a pre-determined threshold, the pre-configured time interval, at which the IOPS, remaining disk space, and remaining bandwidth are obtained periodically for the virtual machine, is extended. Otherwise, if the number of actions executed by the server for the virtual machine is greater than a pre-determined threshold, the pre-configured time interval, at which the IOPS, remaining disk space, and remaining bandwidth are obtained periodically for the virtual machine, is shortened.

In step S303, the obtained monitoring data of the virtual machine is transmitted to the server. In some embodiments, heartbeat packets are utilized to periodically transmit the virtual machines' IOPS, remaining disk space and remaining bandwidth to the server at a pre-determined time interval. Further, upon the detection of changes in the virtual machine, the virtual machine's CPU usage, memory usage and the number of concurrent connections are transmitted to the server by use of heartbeat packets.

Heartbeat packets can monitor the executing status of storage or appliances. One heartbeat packet can transmit strings of information indicating the executing status of the network storage or appliance, the packet being unicasted or broadcasted in the form of UDP.

Corresponding to the above described embodiments of methods of transmitting monitoring data to a server, an apparatus for transmitting monitoring data to a server is provided. As the apparatus embodiments are substantially similar to the method embodiments described above, details are not repeated for simplicity and the pertinent details are illustrated as described above. The following descriptions are merely exemplary.

Figure 4:
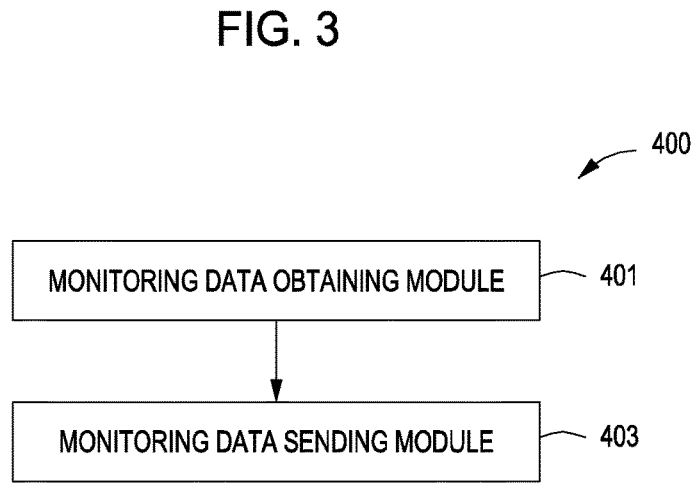
FIG. 4 is a block diagram of an exemplary apparatus of transmitting monitor data to a server in accordance with an embodiment of the present disclosure.

Referring to FIG. 4, a block diagram of an exemplary apparatus for transmitting monitoring data to a server is shown in accordance with embodiments of the present disclosure. The apparatus 400 includes a monitoring data obtaining module 401 and a monitoring data transmitting module 403. The monitoring data obtaining module 401 is configured to obtain monitoring data of a virtual machine. The monitoring data transmitting module 403 is configured to transmit, to the server, the obtained monitoring data of the virtual machine.

Alternatively, the monitoring data obtaining module 401 is configured to obtain monitoring data that includes data of at least one of the following: virtual machine type, CPU utilization, memory utilization, disk space utilization, IOPS (Input Output Per Second), bandwidth and number of concurrent connections.

Further alternatively, the monitoring data transmitting module 403 is configured to transmit to the server the IOPS, remaining disk space, and remaining bandwidth of the virtual machine periodically by use of heartbeat packets according to a pre-determined time interval. The monitoring data transmitting module 403 is also configured to transmit to the server, upon detection of changes in the virtual machine, the CPU utilization, memory utilization and the number of concurrent connections by use of heartbeat packets.

Figure 5:
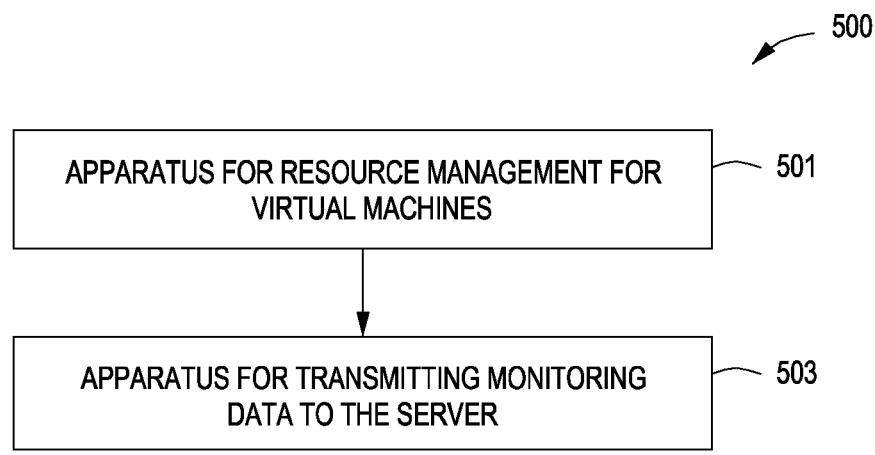
FIG. 5 is a block diagram of an exemplary system for resource management of virtual machines in accordance with an embodiment of the present disclosure.

Referring to FIG. 5, a block diagram of an exemplary system for managing resources for virtual machines is shown in accordance with embodiments of the present disclosure. The system 500 includes an apparatus 501 for resource management for virtual machines and an apparatus 503 for transmitting monitoring data to a server. The apparatus 501 for resource management for virtual machines is configured to obtain from the client the monitoring data for the virtual machine, and to process the virtual machine according to pre-determined match rules. The apparatus 503 for transmitting monitoring data to a server is configured to obtain the monitoring data of the virtual machine, and to transmit to the server the obtained monitoring data of the virtual machine.

Further, the above described apparatus 501 for resource management of virtual machines can be configured in, but not limited to, a computer. It can be configured in any devices suitable for implementing the above described methods of managing resources for virtual machines. For example, an apparatus 501 configured in a computer can obtain monitoring data of virtual machine at a client, match the monitoring data with a pre-determined match rule to generate a match result, the match rule determining whether the monitoring data satisfies a match condition of the match rule, and execute an action for the virtual machine based upon a processing strategy corresponding to the match result. An apparatus 503 configured at a physical server can obtain monitoring data of a virtual machine and transmit to the server the monitoring data of the virtual machine.

Figure 6:
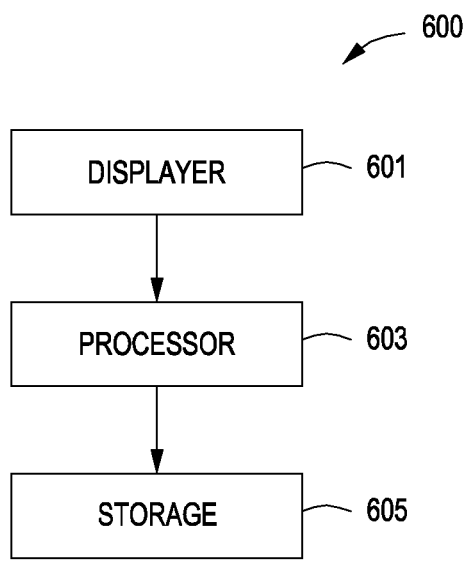
FIG. 6 is a block diagram of an exemplary device in accordance with an embodiment of the present disclosure.

Referring to FIG. 6, a block diagram of an exemplary electronic device is shown in accordance with embodiments of the present disclosure. The device 600 includes a display 601, a processor 603 and a storage 605. The storage 605 is configured to have instructions for managing resources for virtual machines stored thereon. When accessed by the processor 603, the instructions execute the process of obtaining monitoring data of a virtual machine at a client and matching the monitoring data with a pre-determined match rule to generate a match result, where the match rule determines whether the monitoring data satisfy a match condition of the match rule. The process further includes executing an action for the virtual machine based upon a processing strategy corresponding to the match result.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is appreciated that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not necessary functionalities realized by the modules, blocks and the combinations thereof are key to solving the problems addressed by the present disclosure. Further, in order to disclose the novelties of the present disclosure, the above described embodiments may include other modules or blocks.

It is also necessary to point out that, in the claims and specification of the present disclosure, terms such as first and second only are for distinguishing an embodiment or an operation from another embodiment or operation. It does not require or imply that those embodiments or operations have any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of operating a computing system, the method comprising:
   receiving a plurality of monitored data units from a plurality of virtual machines during a pre-determined time interval, each monitored data unit having a type identifier, a monitored condition identifier, and a measured value of the monitored condition identifier;
   for each monitored data unit from a virtual machine,
      determining a type of virtual machine from the type identifier included in a monitored data unit;
      based on the type of virtual machine, searching a database that stores a plurality of types of virtual machines, a plurality of monitored conditions for each type of virtual machine, and a threshold for each monitored condition, a search of the database to determine the threshold of a monitored condition that corresponds with the monitored condition identifier in the monitored data unit;
      determining whether the measured value of the monitored condition identifier of the monitored data unit has passed the threshold that corresponds with the monitored condition that corresponds with the monitored condition identifier in the monitored data unit; and
      outputting to the virtual machine an action to be taken by the virtual machine when the measured value of the monitored condition identifier of the monitored data unit passes the threshold that corresponds with the monitored condition that corresponds with the monitored condition identifier in the monitored data unit;
   determining a number of times that an action was output to the virtual machine during the pre-determined time interval;
   when the number of times that an action was output to the virtual machine passes a pre-configured limit during the pre-determined time interval, reducing the pre-determined time interval; and
   when the number of times that an action was output to the virtual machine does not pass the pre-configured limit during the pre-determined time interval, increasing the pre-determined time interval.

2. The method of claim 1, wherein the plurality of monitored conditions includes two or more of CPU utilization; memory utilization; disk space utilization; IOPS (Input Output Per Second); bandwidth; and a number of concurrent connections.

3. The method of claim 1, wherein a first type of monitored data unit is received on a pre-configured schedule, the first type of monitored data unit having one or more first monitored condition identifiers, and a second type of monitored data unit is received on a random basis, the second type of monitored data unit having one or more second monitored condition identifiers.

4. The method of claim 3, wherein the monitored data units are received on a pre-configured schedule.

5. The method of claim 1, wherein monitored data units are received periodically from the virtual machines.

6. The method of claim 1, wherein a first type of virtual machine has a first threshold for a monitored condition, and a second type of virtual machine has a second threshold for the monitored condition.

7. The method of claim 1, wherein the action is selected from the group consisting of: shutting down the virtual machine; sending an alert; and the combination thereof.

8. A computing system comprising:
   a plurality of virtual machines;
   a database that stores a plurality of types of virtual machines, a plurality of monitored conditions for each type of virtual machine, and a threshold for each monitored condition;
   a server coupled to the plurality of virtual machines and the database, the server to:
      receive a plurality of monitored data units from the plurality of virtual machines during a pre-determined time interval, each monitored data unit having a type identifier, a monitored condition identifier, and a measured value of the monitored condition identifier;
      for each monitored data unit from a virtual machine,
         determine a type of virtual machine from the type identifier included in a monitored data unit;
         based on the type of virtual machine, search the database to determine the threshold of a monitored condition that corresponds with the monitored condition identifier in the monitored data unit;
         determine whether the measured value of the monitored condition identifier of the monitored data unit has passed the threshold that corresponds with the monitored condition that corresponds with the monitored condition identifier in the monitored data unit; and
         output to the virtual machine an action to be taken by the virtual machine when the measured value of the monitored condition identifier of the monitored data unit passes the threshold that corresponds with the monitored condition that corresponds with the monitored condition identifier in the monitored data unit;
      determine a number of times that an action was output to the virtual machine during the pre-determined time interval;
      when the number of times that an action was output to the virtual machine passes a pre-configured limit during the pre-determined time interval, reduce the pre-determined time interval; and
      when the number of times that an action was output to the virtual machine does not pass the pre-configured limit during the pre-determined time interval, increase the pre-determined time interval.

9. The computing system of claim 8, wherein the plurality of monitored conditions includes two or more of CPU utilization; memory utilization; disk space utilization; IOPS (Input Output Per Second); bandwidth; and a number of concurrent connections.

10. The computing system of claim 8, wherein a first type of monitored data unit is received on a pre-configured schedule, the first type of monitored data unit having one or more first monitored condition identifiers, and a second type of monitored data unit is received on a random basis, the second type of monitored data unit having one or more second monitored condition identifiers.

11. The computing system of claim 10, wherein the monitored data units are received on a pre-configured schedule.

12. The computing system of claim 8, wherein the monitored data units are received periodically from the virtual machines.

13. The computing system of claim 8, wherein a first type of virtual machine has a first threshold for a monitored condition, and a second type of virtual machine has a second threshold for the monitored condition.

14. The computing system of claim 8, wherein the action is selected from the group consisting of: shutting down the virtual machine; sending an alert; and the combination thereof.

15. A non-transitory computer-readable medium having computer-readable instructions stored thereon, which when executed by one or more processors of a device, causes the device to execute a method of operating a computing system, the method comprising:
    receiving a plurality of monitored data units from a plurality of virtual machines during a pre-determined time interval, each monitored data unit having a type identifier, a monitored condition identifier, and a measured value of the monitored condition identifier;
    for each monitored data unit from a virtual machine,
        determining a type of virtual machine from the type identifier included in a monitored data unit;
        based on the type of virtual machine, searching a database that stores a plurality of types of virtual machines, a plurality of monitored conditions for each type of virtual machine, and a threshold for each monitored condition, a search of the database to determine the threshold of a monitored condition that corresponds with the monitored condition identifier in the monitored data unit;
        determining whether the measured value of the monitored condition identifier of the monitored data unit has passed the threshold that corresponds with the monitored condition that corresponds with the monitored condition identifier in the monitored data unit; and
        outputting to the virtual machine an action to be taken by the virtual machine when the measured value of the monitored condition identifier of the monitored data unit passes the threshold that corresponds with the monitored condition that corresponds with the monitored condition identifier in the monitored data unit;
    determining a number of times that an action was output to the virtual machine during the pre-determined time interval;
    when the number of times that an action was output to the virtual machine passes a pre-configured limit during the pre-determined time interval, reducing the pre-determined time interval; and
    when the number of times that an action was output to the virtual machine does not pass the pre-configured limit during the pre-determined time interval, increasing the pre-determined time interval.

16. The medium of claim 15, wherein the plurality of monitored conditions includes two or more of CPU utilization; memory utilization; disk space utilization; IOPS (Input Output Per Second); bandwidth; and a number of concurrent connections.

17. The medium of claim 15, wherein a first type of monitored data unit is received on a pre-configured schedule, the first type of monitored data unit having one or more first monitored condition identifiers, and a second type of monitored data unit is received on a random basis, the second type of monitored data unit having one or more second monitored condition identifiers.

18. The medium of claim 17, wherein the monitored data units are received on a pre-configured schedule.

19. The medium of claim 15 wherein the monitored data units are received periodically from the virtual machine.

20. The medium of claim 15, wherein a first type of virtual machine has a first threshold for a monitored condition, and a second type of virtual machine has a second threshold for the monitored condition.

* * * * *